US012314401B1

(12) United States Patent
Matear et al.

(10) Patent No.: US 12,314,401 B1
(45) Date of Patent: May 27, 2025

(54) PREDICTIVE SCAN ENGINE RUNTIME DURATIONS

(71) Applicant: Rapid7, Inc., Boston, MA (US)

(72) Inventors: Luke Matear, Belfast (GB); Thomas McGuinness, Belfast (GB)

(73) Assignee: Rapid7, Inc., Boston, MA (US)

( * ) Notice: Subject to any disclaimer, the term of this patent is extended or adjusted under 35 U.S.C. 154(b) by 330 days.

(21) Appl. No.: 17/851,450

(22) Filed: Jun. 28, 2022

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,096,368 B2 | 8/2006 | Kouznetsov et al. | |
| 7,841,007 B2 | 11/2010 | Currie et al. | |
| 8,578,499 B1 | 11/2013 | Zhu et al. | |
| 10,366,229 B2 | 7/2019 | Martin et al. | |
| 10,491,624 B2 | 11/2019 | Ng et al. | |
| 10,546,170 B2 | 1/2020 | Miller et al. | |
| 2016/0021056 A1 | 1/2016 | Chesla | |
| 2016/0112445 A1* | 4/2016 | Abramowitz | G06Q 40/08 726/23 |
| 2022/0107744 A1* | 4/2022 | Capelo | G06N 20/00 |

FOREIGN PATENT DOCUMENTS

WO 2013155230 B1 4/2020

* cited by examiner

*Primary Examiner* — William J. Goodchild
(74) *Attorney, Agent, or Firm* — Ashwin Anand (57) ABSTRACT

Various embodiments include systems and methods to implement predictive scan engine runtime durations by a security platform to predict runtime durations associated with computing resources. Predictive scan engine runtime durations may be determined by training a prediction model using a multiple linear regression analysis. For example, the security platform may determine a prediction model using training data that associates runtime durations with configuration inputs associated with a security service that operates with respect to a computing resource. Based on the prediction model, the security platform may determine a runtime estimate for a security service run that is configured similarly to a previous security service run used to train the prediction model.

20 Claims, 7 Drawing Sheets

PREDICTIVE SCAN ENGINE RUNTIME DURATIONS

BACKGROUND

Many companies operate computer environments that are connected to public networks such as the internet. While such connections allow users to access resources on public networks, they also expose a company network to cyberattacks. Cyberattacks may obtain sensitive information, gain control of the company's computing systems, or damage company resources. To prevent cyberattacks, security management systems have become increasingly important to protect private company networks against these types of vulnerabilities.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

As disclosed, a security platform may improve protection from cyberattacks based on providing more accurate security service runtimes to plan or schedule security service operations. The security platform may also use the runtime predictions to determine whether a security service has encountered any unusual circumstances that may affect proper operation of the security service. Determining unusual circumstances may be based on whether a current runtime for a security service is greater than a threshold amount above a predicted runtime for the security service.

In some implementations, the security platform may use a prediction model to determine an estimate of a security service runtime duration. For example, the security platform may train the prediction model using a dataset that comprises successfully completed scans associated with security service configuration data, where a given completed scan may be associated with a given runtime duration.

In traditional systems, a user may initiate a security service without an accurate estimate of runtime duration. In such a traditional system, a user may be unaware of whether a security service is operating past an expected runtime, which may result in a user being unaware of any potential problems encountered by the security service during operation. Further, without an accurate runtime estimate, a user may not have enough information to efficiently schedule deployments of additional security services.

As described herein, the security platform may determine a prediction model using different techniques. As one example, the security platform may use a multiple linear regression algorithm to determine the prediction model. In this example, a dataset may indicate different types of configuration input and associated runtimes for a security service. The security platform may apply a multiple linear regression analysis on one or more of the quantifiable input elements of a dataset.

In some implementations, a dataset used to determine a prediction model may indicate one or more of: a security service runtime, a number of endpoints associated with a deployment of assets, a number of attack modules associated with the deployment of assets, a quantity of assets, configuration data associated with a deployment of assets, a number of endpoints associated with a service, among other descriptive aspects of a deployment of assets and/or of a service.

In some implementations, based on the dataset comprising configuration input and runtimes from successful runs of a security service, the prediction model may become increasingly accurate as the dataset is updated from repeated runs of the security service on a given site or on a given asset deployment. For example, the security platform may determine an updated prediction model based on additional training data. For example, periodically, or after a given number of successful runs, a training dataset may be updated. An update to a dataset may be based on a configuration change, additional runs, a change in assets, among other changes associated with a site or deployment of assets.

An advantage of the disclosed security platform is that, based on the security platform using a prediction model to predict security service runtimes, security service scheduling may be improved. Based on improved security service scheduling, an amount of computing resources may be reduced by scaling down resources that are determined to be unnecessary to perform a given security service at a given time. Another advantage of accurate predictions of security service runtimes is that users may decide times for running security services that better fit into a schedule.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as Referring to FIG. 1A, an example computing environment 100 illustrates various components of a security platform 102 comprising predictive scan engine runtime durations, in accordance with some embodiments.

Figure 1A:
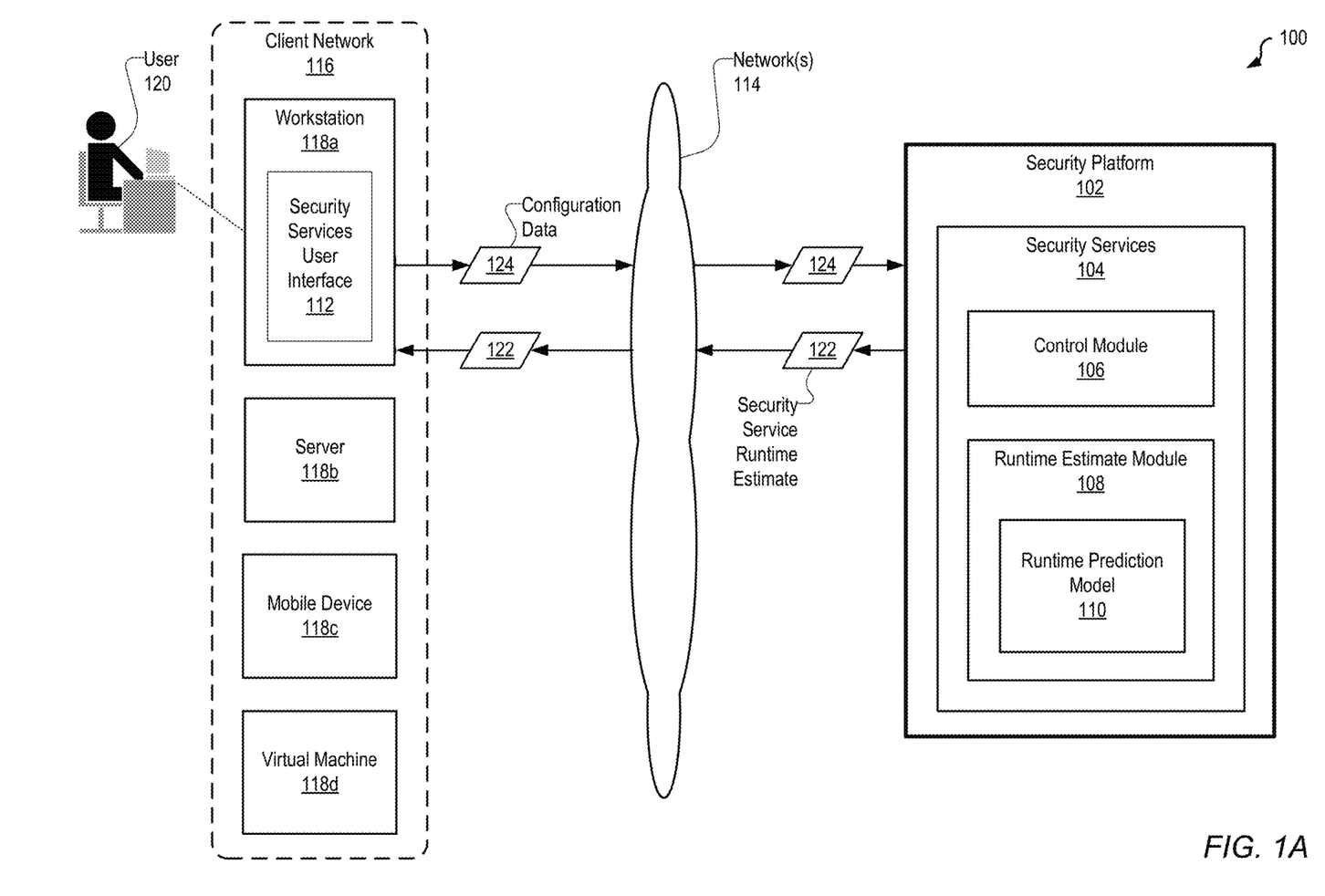
FIG. 1A is a block diagram illustrating an example system that implements a security platform comprising predictive scan engine runtime durations, in accordance with some embodiments.

In some implementations, the security platform 102 may provide one or more security services. In this example, the one or more security services may include scanning a site or asset deployment for cyberattack threats. For example, a scan operation may be deployed for a given site or deployment of assets. The security platform 102 may provide security service runtime estimates that may be used as a basis for scheduling security services and/or for scaling compute instances to perform the security services.

As depicted, the security platform 102 may implement a security service 104. Security service 104 may comprise a control module 106 and a runtime estimate module 108. The runtime estimate module 108 may determine and store one or more runtime prediction models 110. The control module 106 may provide a security services user interface 112. The security services user interface 112 may be accessible over a network to one or more computing resources of a client network, such as network 114 and client network 116. The security service 104 may be implemented as a software and/or hardware module.

The client network 116 may include a plurality of computing resources, such as computing resources 118a-118d. In this example, computing resources 118a-118d are depicted as a workstation, a server, a mobile device, and a virtual machine. In other examples, a computing resource 118 The client network 104 may include workstations, servers, personal computers, cloud compute instances, mobile devices, among other types of computing resources, or some other resource that may be vulnerable to a cyberattack. Computing resources 118 are described in greater detail with respect to FIG. 2.

In this example, a user 120 may interact with and initiate one or more security services using the security services user interface 112. The security services user interface 112 may be provided by the security platform 102. The security services user interface 112 may be usable to access one or more of the features provided by the security platform 102. The one or more features may include options for requesting security services, such as scan services, from the security platform 102. The security platform 102 may provide the security services user interface to any computing resource 118 within the client network 116. While in this example, the user is operating a workstation, in other examples, the user may be operating other computing resources within a given client network. The client network 116 may be among a plurality of client networks.

Figure 1B:
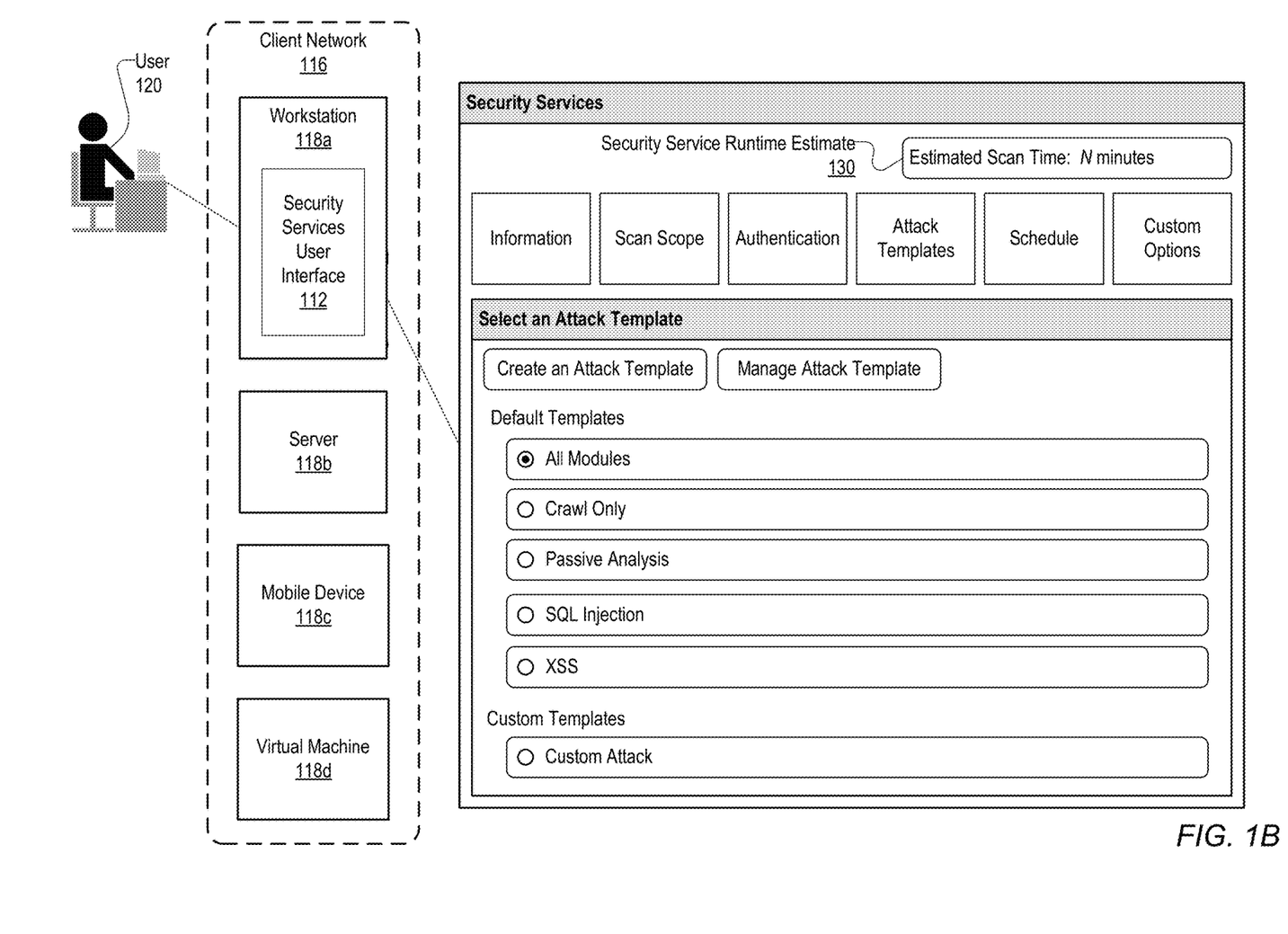
FIG. 1B is a block diagram illustrating an example user interface provided by a security platform that determines predicted runtime durations, in accordance with some embodiments.

In some implementations, the security services user interface 112 may indicate a security service runtime estimate 122 for a security service. The security service runtime estimate may be based on configuration data 124. Configuration data 124 may comprise one or more configuration inputs specified in the security services user interface 112. An example of the security services user interface 112 indicating a security service runtime estimate is depicted in FIG. 1B.

The security service runtime estimate 122 may be determined by the security platform 102 in response to a current configuration of the security service 104, in response to a change in configuration inputs associated with the security service 104, or in response to some other condition. The security service runtime estimate 122 may be indicated in terms of minutes, or some other interval of time.

In some implementations, the security service may be specified by the configuration data 124, which may indicate parameters used by the security service 104 in performing a scan or other security service. In some examples, the configuration data 124 may indicate one or more of: a number of endpoints associated with a deployment of assets, a number of attack modules associated with the deployment of assets, a quantity of assets, a number of endpoints associated with a service, among other descriptive aspects of a deployment of assets and/or of a service.

In some implementations, the security platform 102 may scale scan engines based on a queue of security service requests and estimated runtimes. For example, based on runtime estimates for one or more of the queued security service requests, the security platform 102 may scale scan engines up or down at a particular time based on expected scanning loads. A scanning load may be based on when a particular scan may initiate, how extensive the scan may be, and the expected runtime of the scan. Based on the scanning load, the security platform 102 may scale a number of scan engines usable to perform the scan. The security platform 102 may scale the number of scan engines by increasing or decreasing a number of deployed scan engines.

Figure 3:
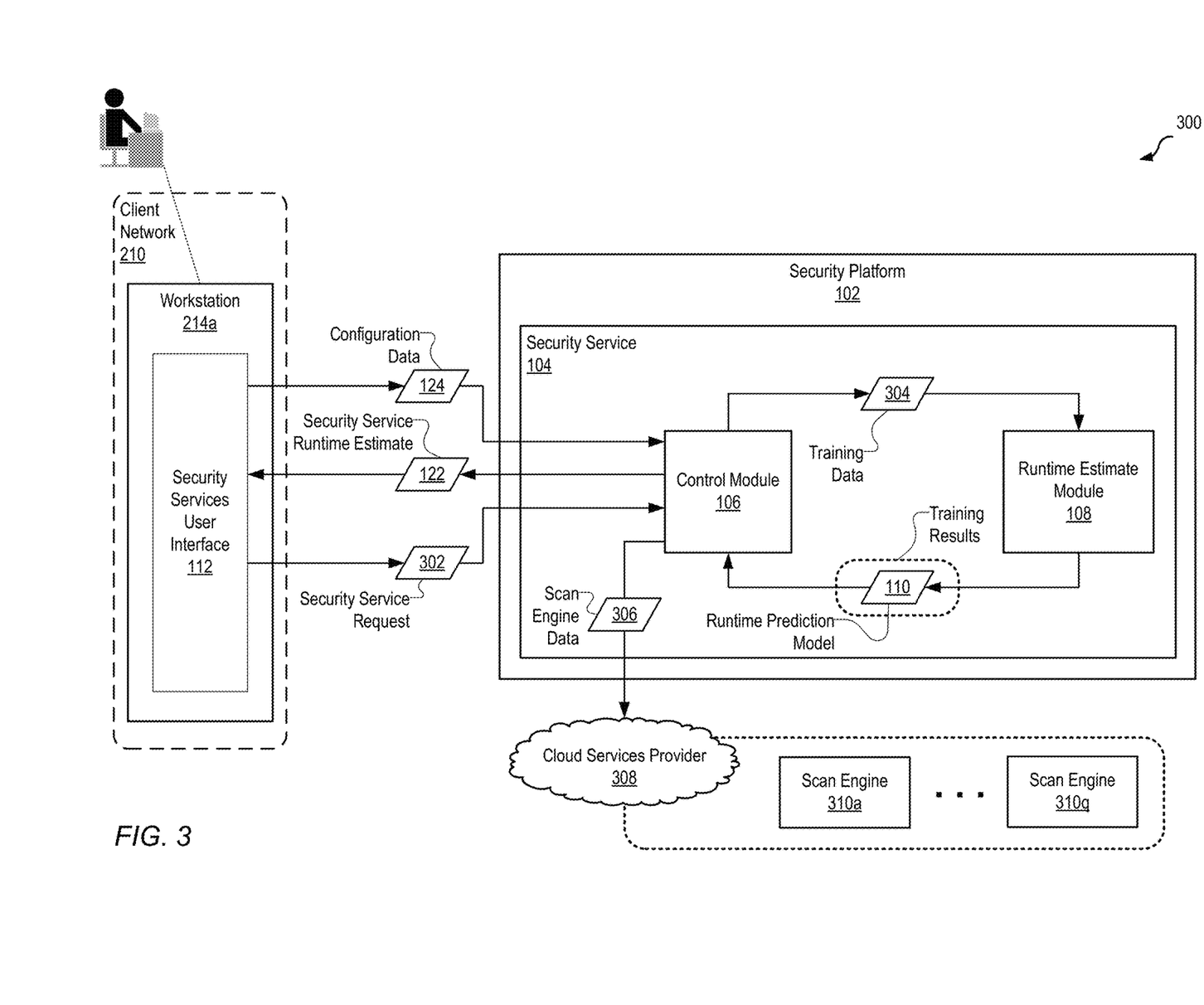
FIG. 3 is a block diagram illustrating a security platform comprising a runtime prediction model, in accordance with some embodiments.

As described in greater detail with respect to FIG. 3, the security platform 102 may provision and deploy one or more scan engines to perform scan services. The scan engines may be provisioned and deployed within a cloud computing environment provided by a cloud services provider. The security platform 102 may provision and deploy any number of scan engines within a cloud environment provided by a cloud services provider.

With respect to the scan service, the security service 104 may provide a user interface usable to create at least one custom check file. The security service 110 may also use default options for scanning for cyberattacks. In some examples, a check file may comprise one or more files in an XML file format that may define a customer-authored vulnerability check for a particular security vulnerability, and a customer may then load any check files into a local security console prior to a scan, for storage within a local filesystem. A user interface presented at the local security console (also referred to herein as a "security console user interface" or simply a "console") may provide site configuration options that allow the customer to identify the customer-authored vulnerability check for use within a scan template and to select a particular scan engine instance associated with a particular scan engine that is to be utilized to perform the scan.

Continuing this example, in response to initiation of the scan, the local security console may access the local filesystem to retrieve the custom check file(s) associated with the identified custom vulnerability check for transfer to a scan engine. In some examples, if custom checks are not disabled for a scan engine, the local security console may initiate transfer of the custom check file(s) associated with the identified custom vulnerability check from the local filesystem to the scan engine. The custom check file(s) received by the scan engine may be moved into the appropriate custom scanner directories of a filesystem accessible by the scan engine. The scan engine may prepare the scan process, which may include locating and retrieving custom check file(s). The custom vulnerability check information may be loaded into the scan engine's vulnerability manager and/or vulnerability check manager components. In this example, a scan process may begin, and the scan engine may use the custom vulnerability check information. In this example, subsequent to completion of a scan, one or more results of the scan may be communicated from the scan engine for presentation to the customer via the local security console.

The control module 106 of the security platform 102 may receive configuration data 124, indicate security service runtime estimates 122, receive scan requests, deploy scan engines, initiate scans, determine runtime prediction models 110, and update the prediction model 110.

The runtime estimate module 108 may determine a runtime prediction model 110 using various techniques. For example, the runtime estimate module 108 may, based on configuration data 124, use linear regression analysis to determine the runtime prediction model 110. The configuration data 124 may be used as training data by the runtime estimate module 108 and the runtime prediction model 110 may be a training result. In this example, using multiple linear regression, one or more quantifiable configuration inputs may each be an independent variable, and a runtime duration may be a dependent variable. Multiple linear regression may model a relationship between quantifiable variables, such as configuration inputs, and a response variable, such as a runtime duration, by fitting a linear equation to observed data. The observed data may be training data that associates runtime durations for successful runs with one or more configuration inputs.

Configuration inputs may include one or more of: a number of endpoints, a number of attack modules, a quantity of assets, configuration settings associated with a deployment of assets, among other descriptive aspects of a deployment of assets and/or of a service or site. For example, if a first configuration input is indicative of a site with N endpoints, then a first explanatory variable for a multiple linear regression model may be N, with a response variable being a measured runtime duration for a scan of a site with N endpoints. Similarly, if a second configuration input is indicative of M attack modules to deploy, then a second explanatory variable for the multiple linear regression model may be M. Similarly, for one or more quantifiable configuration inputs.

In some implementations, the runtime estimate module 108 may determine a runtime prediction model 110 using machine learning techniques. For example, the runtime prediction model 110 may be a trained machine learning model. A machine learning model may be trained using training data comprising the configuration data 124. The training data may comprise a plurality of associations between configuration data 124 and runtime durations.

The runtime estimate module 108 may determine an updated runtime prediction model periodically, in response to an indication to update the prediction model, in response to a scan using updated configuration inputs, or after collecting a threshold number of instances of configuration data. As a first example, the runtime estimate module 108 may determine an updated runtime prediction model after lapse of a specified period of time, where the period of time may be configurable. As a second example, the runtime estimate module 108 may determine an updated runtime prediction model in response to a request from the security platform 102. As a third example, the runtime estimate module 108 may determine an updated runtime prediction model based on receiving or collecting a number of configuration data instances, where the number is greater than a threshold number. The threshold number may be configurable.

In some implementations, the security platform 102 may also use the runtime predictions to determine whether a security service, such as a scan, has encountered any unusual circumstances that may affect proper operation of the security service. Determining unusual circumstances may be based on whether a current runtime for a security service is greater than a threshold amount above a predicted runtime for the security service. For example, after initiating of a security service, if more than the threshold amount of time passes without the security service completing, the security platform 102 may issue an alert indicative of a potential problem with the scan.

Referring to FIG. 1B, an example user interface illustrates various components of a security platform 102 that implements a security platform comprising predictive scan engine runtime durations, in accordance with some embodiments.

As described with respect to FIG. 1A, the security platform 102 may provide a security services user interface 112 to a computing resource 118 of a client network 116. In this example, some of the features of the security services user interface 112 are depicted. For example, the security services user interface 112 may depict user interface elements indicating "Information", "Scan Scope", "Authentication", "Attack Templates", "Schedule", and "Custom Options". These user interface elements may provide a user with navigation options to obtain additional information, specify the scope of a scan, automatically analyze login pages and authenticate credentials, select types of attacks to run against an app during a scan, schedule scans, and customize options.

In this example, the security service user interface 112 depicts options associated with selecting attack templates. For example, a user may create an attack template, manage an attack template, or select among default templates or custom templates. An attack template may be a pre-configured set of attacks and performance options. As depicted, a user may enable "All Modules", which may provide comprehensive coverage of vulnerabilities.

In this example, each selection option with respect to specifying a type of scan may be considered a configuration input. The configuration data 124 described in FIG. 1A may comprise one or more indications of configuration inputs. Continuing this example, for a given selection of one or more configuration inputs associated with a given scan, the security platform 102 may determine configuration data 124. For each modification to a configuration input, the security platform 101 may determine updated configuration data 124. Similarly, for each updated configuration data 124, the security platform 102 may use a runtime prediction model to determine an estimated runtime.

Continuing this example, for given updated configuration data 124, and an associated estimated runtime, the security platform 102 may update the security services user interface 112 to depict a runtime estimate for a current selection of configuration inputs. As depicted in FIG. 1B, for a given selection of configuration inputs with respect to a given site or deployment of assets, the security services user interface 112 depicts a security services runtime estimate 130 as, "Estimated Scan Time: N minutes", where N may be an output produced by the runtime prediction model.

Figure 2:
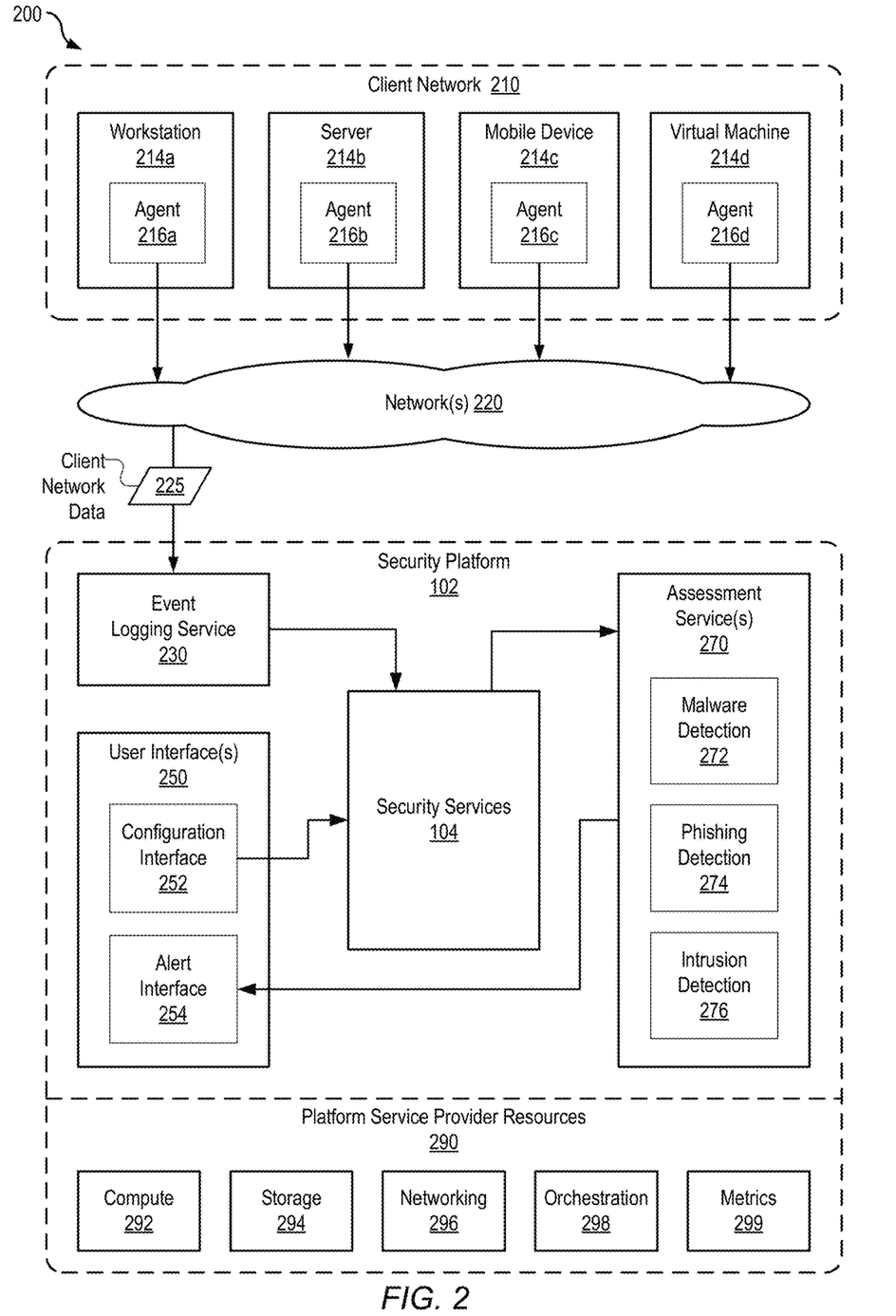
FIG. 2 is a block diagram illustrating example computing resources that implement a security platform, in accordance with some embodiments.

FIG. 2 is a block diagram illustrating the security platform 102 implemented by a platform service provider network, according to some embodiments.

The security platform 102 may comprise one or more services implemented within a cloud computing environment and/or on a platform service provider network, such as a platform-as-a-service (PaaS) network, an infrastructure-as-a-service provider (IaaS) network, or a software-as-a-service (SaaS) network. The security platform 102 may be configured to communicate with agents 216a-d deployed on machines 514a-d in a client network 210. In this example, the client network 116 described with respect to FIGS. 1A and 1B may be implemented by the client network 210, and computing resources 118a-118d may be implemented by computing resources 214a-214d. Similarly, user interface(s) 250 may implement security services user interface 112.

The agents 216 may communicate with the security platform 102 over one or more intermediary networks 220. In some embodiments, the agents 216 may be configured to collect or compile network activity data or network event data, and transmit the data, depicted as client network data 225, to the security platform 102. The security platform 102 may receive network activity data from many different client networks operated by different entities, companies, organizations, groups, etc., and perform remote monitoring of the networks of these different clients.

As shown, the client network 210 in this example includes different types of computing resources, such as a workstation 214a, a server 214b, a mobile device 214c, and a virtual machine 214d. The virtual machine 214d may be an instance of a computer and operating system that is emulated and hosted on a physical virtual machine host. The virtual machine host may implement virtualization hardware and/or software (e.g., a hypervisor) to execute and manage multiple instances of guest operating systems. Example implementations of such virtualization technologies include VMware ESX/ESXI, Microsoft Hyper-V, Amazon Web Services, and Microsoft Azure. Another type of virtualized execution environment may be a hosted container, which provides a portable and isolated execution environment over a host operating system of a physical host. Examples of container hosting technologies include Docker, Google Kubernetes, Amazon Web Services, and Microsoft Azure. In some embodiments, the virtual machine 214d may be hosted in a platform service provider network, such as the platform service provider network that is hosting the security platform 102. In some embodiments, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to enable communications between the agents 216 and the security platform 102. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet.

In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the remote machines 214 and the security platform 102. In some embodiments, the agents 216 may transmit the client network data 225 to the security platform 102 over secure communication channels such as transport layer security (TLS) connections implemented over the network 220.

As shown in this example, the security platform 102 is implemented using a number of supporting services 230, 108, 250, and 270 implemented by the platform service provider network. Clients of the security platform 102 may convey service requests to and receive responses from these services via their respective service interfaces. In some embodiments, the service request and responses may be defined as part of a RESTful API (e.g., one or more web services). The requests and responses may be formatted as JSON documents. In some embodiments, the security platform 102 may implement service interfaces using other types of remote procedure calling protocols, such as Google Protocol Buffers. The platform service provider network may provide the hardware and/or software needed to implement service endpoints for these services, and the request routing facilities to ensure that a request is properly routed to the appropriate endpoints.

As shown, the platform service provider network may provide different types of computing resources, such as platform service provider resources 290, which can be used by customers to implement hosted services. As shown, the platform service provider may provide resource services such as compute resource service 292, storage resource service 294, networking resources service 296, orchestration service 298, and resource metrics service 299. The services of the security platform 102 may be built using these underlying resource services provided by the platform service provider.

In some embodiments, the platform service provider resources 290 may implement features such as load balancing of service requests and/or dynamic management and scaling of service node pools. In some embodiments, each of the services 230, 108, 250, and 270 may be implemented using a pool of service nodes provided by the platform service provider, which may be individual instances of virtual machines. In some embodiments, the platform service provider may be a provider such as Amazon Web Services or Microsoft Azure.

In some embodiments, the security platform 102 may be configured to monitor, analyze, and respond to security-related incidents that are detected in the remote client networks 210. In some embodiments, the security platform 102 may implement an event logging service 230 that receives client network data 225 from a client network 210 and stores the received data. The event logging service 230 may implement service functionality to allow users or other software components to query the event logs.

As shown, in some embodiments, the assessment service(s) 270 may implement a variety of monitoring processes to generate alerts in response to detected security problems in the client network 210. These alerts may be forwarded to an alert interface 254, which may allow human security analysts to perform a more in-depth examination of any underlying security problems. For example, in some embodiments, a malware detection module 272 may examine collected machine event logs to detect installation of a particular type of malware executable.

As another example, a phishing detection module 274 may examine the email event logs to detect phishing attacks using new or unusual email addresses, web addresses, or email content. As yet another example, an intrusion detection module 276 may examine the network event logs to detect suspicious communication patterns or attacker packet signatures. In some embodiments, the alerts generated by the assessment service(s) 270 may trigger automated mitigation actions to be performed on the client network 210 to address detected threats in the client network.

In some embodiments, the security platform 102 may implement one or more user interface(s) 250, which may be implemented as GUIs or web interfaces viewable using a web browser. In some embodiments, these user interfaces 250 may be implemented by client-side applications. As shown, the user interfaces may include the alert interface 254 to notify users of detected alerts. In some embodiments, the alert interface 254 may be accessible from both the client network 210 and a central monitoring location where security analysts are monitoring the client network.

In some embodiments, the user interface(s) 250 may also implement a configuration interface 252. The configuration interface 252 may be used to configure various aspects of the security platform 102, including the security service 108. For example, the configuration interface 252 may be used to control various aspects of how the security service 108 operates, including initiating a scan, indicating one or more computing resources, and/or specifying a scanning schedule.

In some implementations, the security platform 102 may be implemented within a container system of a cloud computing environment or a container system of a data center. For example, a container system may be implemented by one or more container orchestration systems, including Kubernetes™, Docker Swarm™, among others. The container orchestration system may run on a cluster of nodes. In some examples, a given node may comprise a container runtime, where the given node may be implemented by one or more compute instances provided by a cloud services provider. In some examples, a given node among the cluster of nodes may comprise a container runtime, compute resources, memory, and one or more container instances.

In some implementations, the security platform 102 may comprise multiple services. For example, the security platform 102 may comprise services implemented by containerized applications operating on one or more nodes of a cluster. In this example, the security platform 102 may be implemented by a one or more containerized applications.

FIG. 3 is a block diagram 300 illustrating various components of a security platform 102 comprising predictive scan engine runtime durations, according to some embodiments.

In some implementations, the security platform 102 may receive configuration data 124, determine a security service runtime estimate 122, and deploy scan engines in response to a security service request 302. For example, the security platform 102 may, for a given scan configuration, determine a security service runtime estimate 122 and provide the security service runtime estimate 122 within the security services user interface 112. The configuration data 124 may comprise the scan configuration. In response to the security service request 302, the security platform 102 may initiate a scan in accordance with the with the configuration data 124.

In this example, the security platform 102 may determine training data 304 usable to determine updated runtime prediction models 110. The security platform 102 may determine training data 304 in response to successfully completed security service operations, such as a successfully completed scan. In this example, the security platform 102 may determine the training data 304 to comprise associations between runtime durations for a given scan and configuration data 124. The runtime estimate module 108 may determine training results that comprise the runtime prediction model 110. Determining the runtime prediction model 110 is described above with respect to FIGS. 1A and 1B.

In this example, the control module 106 may perform a scan operation in response to a security service request 302. For example, in response to the security service request 302, the security platform 102 may determine scan engine data 306. Scan engine data 306 may comprise instructions to a cloud services provider 308 that indicate one or more of: provisioning of compute instances, deploying one or more scan engines 310a-310q onto a compute instance, monitoring of compute instances, or deprovisioning of compute instances. As described herein, deployment of a scan engine 310 may comprise provisioning, configuring, and/or initiating a scan engine on one or more compute instances.

Cloud services provider 308 may be implemented as a system and computing environment that provides services to users of the cloud services provider 308 through the sharing of computing resources. The cloud services provider 308 may provide on-demand access to a shared pool of configurable computing resources such as computer networks, servers, storage, applications, services, and so on. The shared pool of configurable resources may be rapidly provisioned and released to a user of the cloud services provider 308 with minimal management effort. Example cloud services providers include Amazon™ AWS, Microsoft Azure™, Google Cloud Platform™, among others. A given scan engine may be implemented by one or more compute instances provided by the cloud services provider 308.

Figure 4:
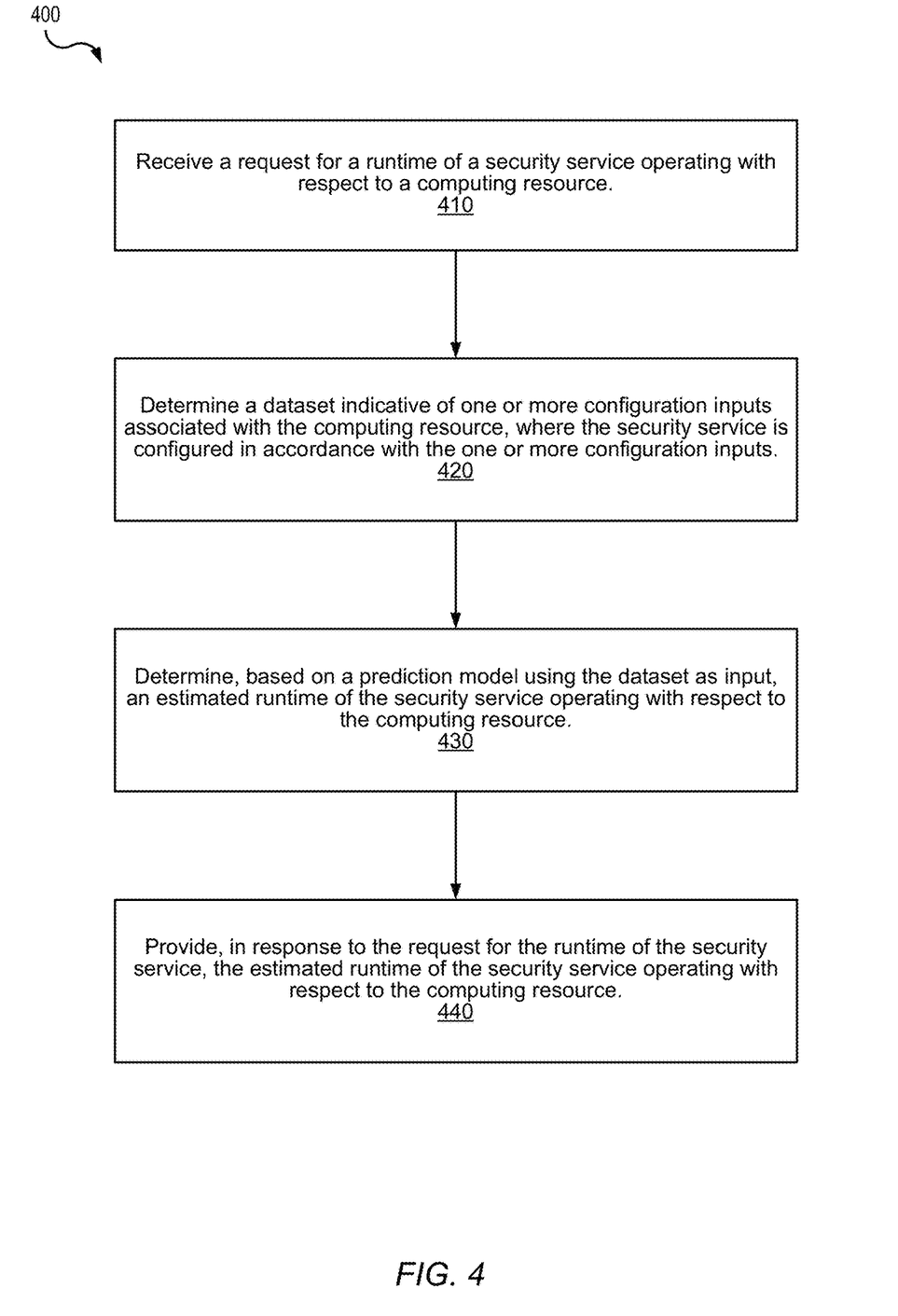
FIG. 4 is a block diagram illustrating an example of a security platform determining an estimate runtime of a security service, according to some embodiments.

FIG. 4 is a flowchart 400 that illustrates an example of the security platform that determines predicted runtime durations, according to some embodiments. In FIG. 4, one or more hardware processors may be used to implement the example process.

The example process includes: receiving, at 410, a request for a runtime of a security service operating with respect to a computing resource; determining, at 420, a dataset indicative of one or more configuration inputs associated with the security service configured to operate with respect to the computing resource; determining, at 430, based on a prediction model using the dataset as input, an estimated runtime of the security service operating with respect to the computing resource; and providing, at 440, in response to the request for the runtime of the security service, the estimated runtime of the security service operating with respect to the computing resource.

Receiving, at 410, the request for the runtime of the security service operating with respect to the computing resource may be carried out as described with respect to FIGS. 1A-3. For example, the security platform 102 may receive configuration data 124 that is indicative of one or more configuration inputs associated with the security service operating with respect to a computing resource. In this example, the computing resource may be a site, and the security service may be a scan of the site.

Determining, at 420, a dataset indicative of one or more configuration inputs associated with the computing resource, where the security service is configured in accordance with the one or more configuration inputs. Determining the dataset may be carried out as described with respect to FIGS. 1A-3. For example, the dataset may comprise the configuration data 124 described with respect to FIGS. 1A and 1B.

Determining, at 430, based on a prediction model using the dataset as input, an estimated runtime of the security service operating with respect to the computing resource may be carried out as described with respect to FIGS. 1A-3. For example, the configuration data 124 may be used by runtime prediction model 110 to determine a security service runtime estimate 122. In this example, the estimated runtime may comprise the security service estimated runtime 122.

Providing, at 440, in response to the request for the runtime of the security service, the estimated runtime of the security service operating with respect to the computing resource may be carried out as described with respect to FIGS. 1A-3. For example, the security platform 102 may provide the security service estimated runtime 122 to be displayed within the security services user interface 112.

Figure 5:
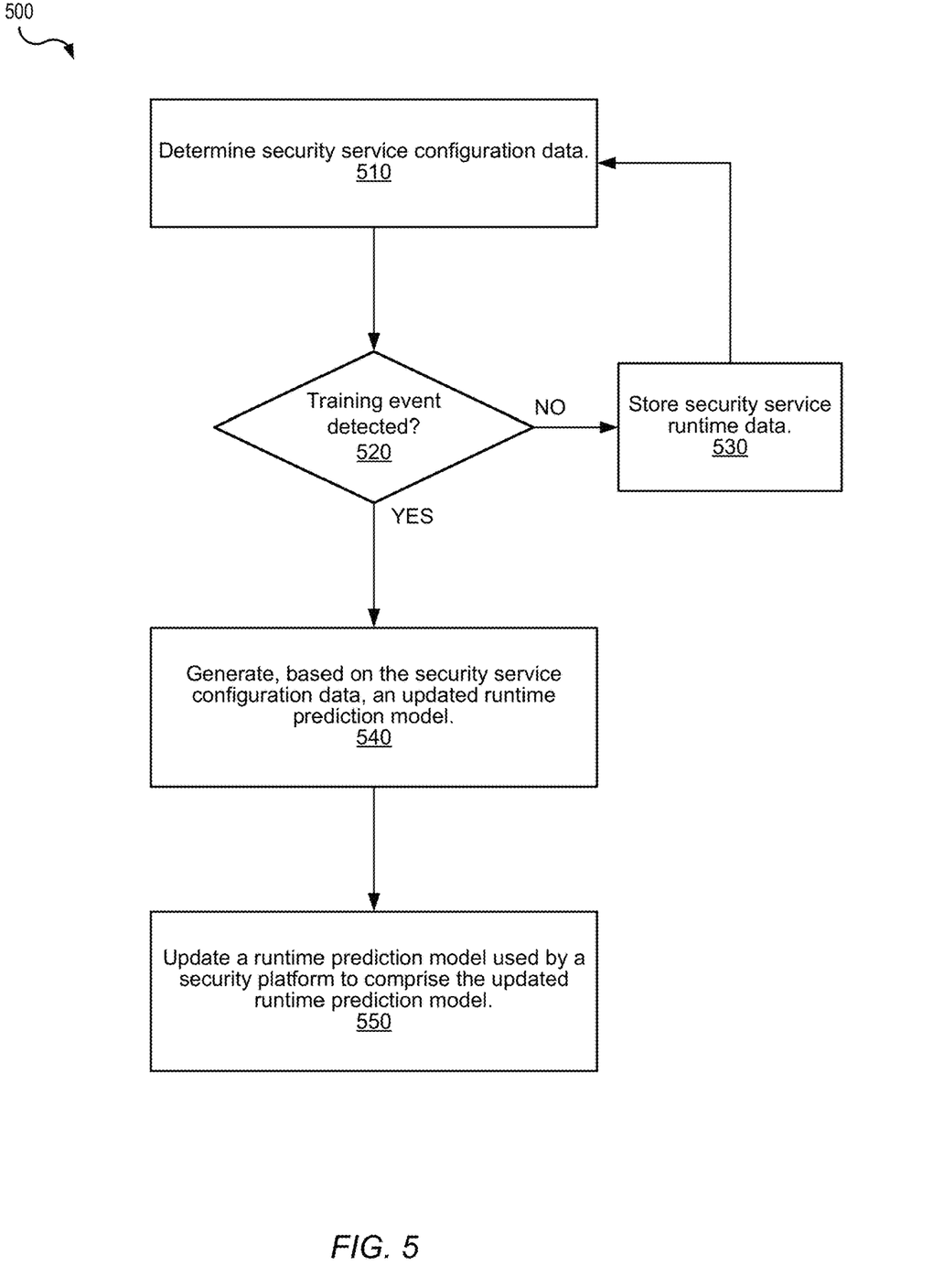
FIG. 5 is a flowchart that illustrates an example of a security platform determining an updated prediction model, according to some embodiments.

Thus, FIG. 5 illustrates an example of a process of using the security platform 102 providing an estimated runtime duration for a security service operating with respect to a computing resource, such as a computing resource within a client network 116.

FIG. 5 is a flowchart 500 that illustrates an example of the security platform 102 determining an updated prediction model, according to some embodiments. In FIG. 5, one or more hardware processors may be used to implement the example process.

In this example, the security platform 102 determines to update a prediction model. The example process includes: determining, at 510, security service configuration data; determining, at 520, whether a training event has been detected; storing, at 530, in response to no training event detected, the configuration data; generating, at 540, in response to a training event detected and based on the configuration data, an updated runtime prediction model; and updating, at 550, a runtime prediction model used by a security platform to comprise the updated runtime prediction model.

The example process may be carried out as described with respect to FIGS. 1A-3. For example, the security platform 102 may determine configuration data 124 associated with a particular run of the security service on a particular computing resource. The security platform 102 may, at 510, determine configuration data 124 based on configuration inputs specified within a security services user interface 112. The security platform may determine an actual runtime duration by timing a successful run of the security service operating with respect to the particular computing resource, where the security service 102 is configured according to the configuration data 124. In this example, the security platform 102 may determine training data that associates the configuration data 124 with the actual runtime duration. The training data may include some or all previous training data. The security platform 102 may determine, at 540 and 550, an updated runtime prediction model as described with respect to FIGS. 1A-3. The security platform 102 may determine, at 520, whether a training event has been detected as described with respect to FIGS. 1A-3, where the security platform 102 may determine a training event based on lapse of a specified period of time, based on N successful runs of the security service, or based on some other training event.

Figure 6:
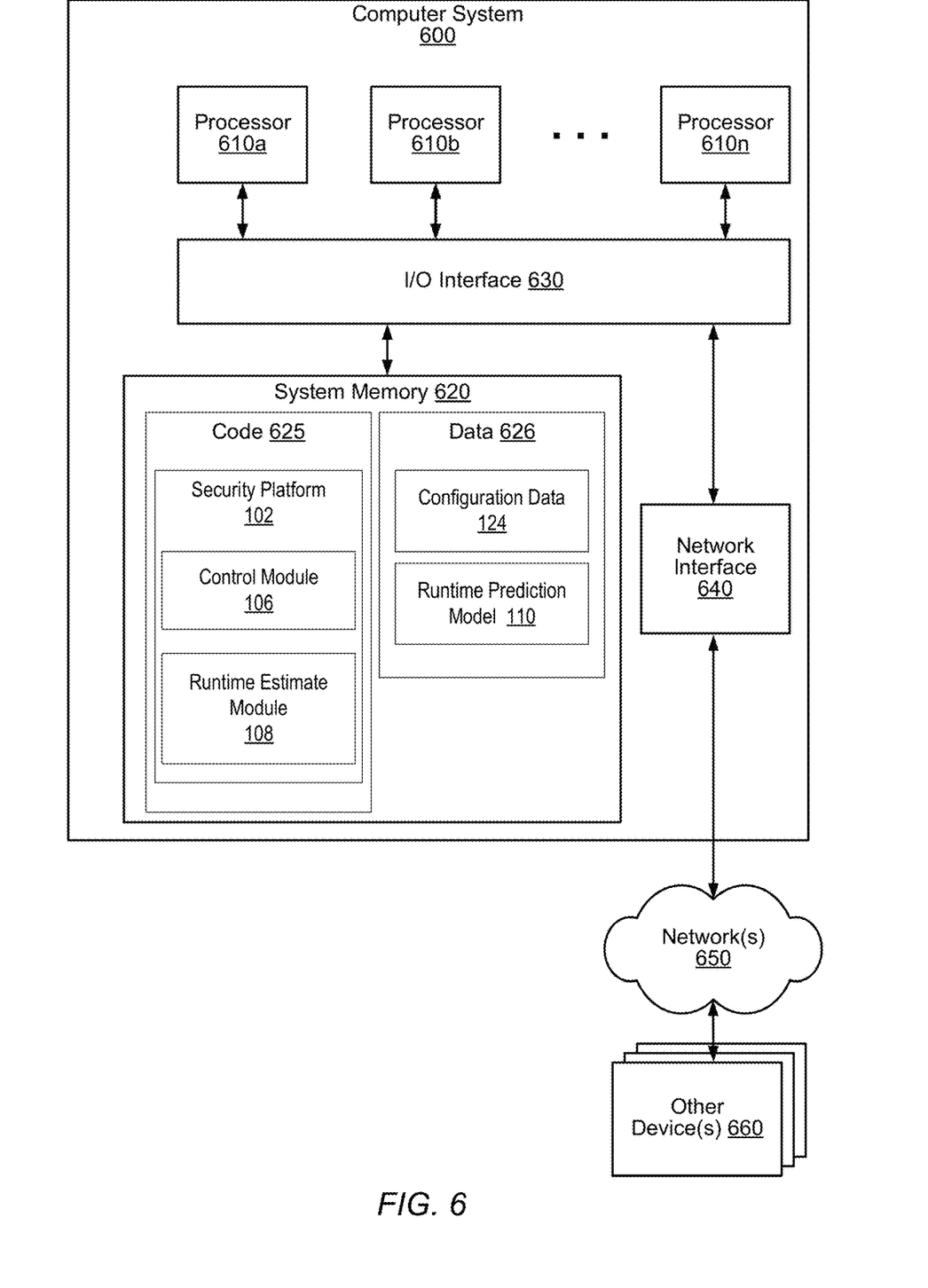
FIG. 6 is a block diagram illustrating an example computer system that may be used to implement one or more portions of a system that implements predictive scan engine runtime durations, according to some embodiments.

FIG. 6 is a block diagram illustrating an example computer system 600 that is used to implement one or more portions of a system that implements a security posture recommender system, according to some embodiments. For example, the computer system 600 may be a server that implements one or more components of the security platform 102 of FIGS. 1 and 2.

Computer system 600 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 600 includes one or more processors 610, which may include multiple cores coupled to a system memory 620 via an input/output (I/O) interface 630. Computer system 600 further includes a network interface 640 coupled to I/O interface 630. In some embodiments, computer system 600 may be a uniprocessor system including one processor 610, or a multiprocessor system including several processors 610a-n, as shown. The processors 610 may be any suitable processors capable of executing instructions. For example, in various embodiments, processors 610 may implement one of a number of instruction set architectures (ISAs), such as the x86, PowerPC, SPARC, or MIPS ISA.

As shown, the computer system 600 may also include one or more network communication devices (e.g., network interface 640) for communicating with other systems and/or components over a communications network. For example, an instance of an application executing on computer system 600 may use network interface 640 to communicate with another server application executing on another computer system, as described herein.

As shown, computer system 600 may use its network interface 640 to communicate with one or more other devices 660, such as persistent storage devices and/or one or more I/O devices. In some embodiments, some of these other devices may be implemented locally on the computer system 600, accessible via the I/O interface 630. In various embodiments, persistent storage devices may include disk drives, tape drives, solid state memory, other mass storage devices, or any other persistent storage device. The computer system 600 may store instructions and/or data in persistent storage devices and retrieve the stored instruction and/or data as needed.

As shown, the computer system 600 may include one or more system memories 620 that store instructions and data accessible by processor(s) 610. In various embodiments, system memories 620 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 620 may be used to store code 625 or executable instructions to implement the methods and techniques described herein. For example, the executable instructions may include instructions to implement the network scanner 120 (including its associated sub-components: the network latency component 121; the dynamic RTT timeout value 122; the RTT parameters 123; and the statistics components 128), as discussed. The system memory 620 may also be used to store data 626 needed or produced by the executable instructions. For example, the in-memory data 626 may include snapshot data 122, prediction model 120, regional model 404, scan queue data 302, and prediction data 304, as discussed.

In some embodiments, some of the code 625 or executable instructions may be persistently stored on the computer system 600 and may have been loaded from external storage media. The persistent storage of the computer system 600 and the external media are examples of non-transitory computer-readable storage media, which may be used to store program instructions to be executed by the computer system 600. A non-transitory computer-readable storage medium may provide the capability to store information in a form readable by a machine (e.g., computer system 600). Non-transitory computer-readable media may include storage media such as magnetic or optical media, disk or DVD/CD-ROM devices, archival tapes, network-attached storage systems, or other computer systems.

In some embodiments, the I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

In some embodiments, the network interface 640 may allow data to be exchanged between computer system 600 and other devices attached to a network. The network interface 640 may also allow communication between computer system 600 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 600 or may be distributed on various nodes of a distributed system that includes computer system 600. In some embodiments, similar input/output devices may be separate from computer system 600 and may interact with one or more nodes of a distributed system that includes computer system 600 through a wired or wireless connection, such as over network interface 640. Network interface 640 may commonly support one or more wireless networking protocols (e.g., Wi-Fi/IEEE 802.11, or another wireless networking standard). In some embodiments, the network interface 640 may support communication via telecommunications/telephony networks such as analog voice networks or digital fiber communications networks, via storage area networks such as Fibre Channel SANs, or via any other suitable type of network and/or protocol.

Advantages and features of the present disclosure may be further described by the following 20 statements.

1. A method comprising: receiving a request for a runtime of a security service operating with respect to a computing resource; determining a dataset indicative of one or more configuration inputs associated with the computing resource, wherein the security service is configured in accordance with the one or more configuration inputs; determining, based on a prediction model using the dataset as input, an estimated runtime of the security service operating with respect to the computing resource; and providing, in response to the request for the runtime of the security service, the estimated runtime of the security service operating with respect to the computing resource.
2. The method of any of the preceding statements, further comprising: receiving, prior to the receiving the request for the runtime of the security service, a first training dataset indicative of a plurality of configuration inputs associated with a plurality of security service runs associated with a plurality of computing resources; receiving, prior to the receiving the request for the runtime of the security service, a second training dataset indicative of a plurality of runtimes associated with the plurality of security service runs; training, based on the first training dataset and on the second training dataset, the prediction model that estimates runtimes.
3. The method of any of the preceding statements, further comprising: initiating a security service run with respect to the computing resource; determining, based on the security service run, first data indicative of the one or more configuration inputs associated with the computing resource; determining, based on the security service run, second data indicative of a runtime associated with the security service run; and training, based on the first training dataset, on the first data, on the second training dataset, and on the second data, an updated prediction model that estimates runtimes; wherein the prediction model comprises the updated prediction model.
4. The method of any of the preceding statements, further comprising: determining a training event indicative of one or more conditions associated with retraining the prediction model; and training, in response to the training event, an updated computation model that estimates runtimes; wherein the prediction model comprises the update prediction model.
5. The method of any of the preceding statements, wherein the training event comprises at least one of: lapse of a specified period of time, completion of a threshold number of operational runs of the security service, or a change in a configuration input associated with the computing resource.
6. The method of any of the preceding statements, wherein the security service is a scan for cyberattacks on the computing resource.
7. The method of any of the preceding statements, wherein the one or more configuration inputs associated with the computing resource indicate one or more of: a number of endpoints to scan, a number of attack modules, a number of compute instances configured to run the security service, or a hardware configuration of the compute instances.
8. A system comprising: a memory storing executable instructions; and one or more processors that execute the executable instructions to: receive a request for a runtime of a security service operating with respect to a computing resource; determine a dataset indicative of one or more configuration inputs associated with the computing resource, wherein the security service is configured in accordance with the one or more configuration inputs; determine, based on a prediction model using the dataset as input, an estimated runtime of the security service operating with respect to the computing resource; and provide, in response to the request for the runtime of the security service, the estimated runtime of the security service operating with respect to the computing resource.
9. The system of any of the preceding statements, wherein the one or more processors further execute the executable instructions to: receive, prior to the receiving the request for the runtime of the security service, a first training dataset indicative of a plurality of configuration inputs associated with a plurality of security service runs associated with a plurality of computing resources; receive, prior to the receiving the request for the runtime of the security service, a second training dataset indicative of a plurality of runtimes associated with the plurality of security service runs; train, based on the first training dataset and on the second training dataset, the prediction model that estimates runtimes.
10. The system of any of the preceding statements, wherein the one or more processors further execute the executable instructions to: initiate a security service run with respect to the computing resource; determine, based on the security service run, first data indicative of the one or more configuration inputs associated with the computing resource; determine, based on the security service run, second data indicative of a runtime associated with the security service run; and train, based on the first training dataset, on the first data, on the second training dataset, and on the second data, an updated prediction model that estimates runtimes; wherein the prediction model comprises the updated prediction model.

11. The system of any of the preceding statements, wherein the one or more processors further execute the executable instructions to: determine a training event indicative of one or more conditions associated with retraining the prediction model; and train, in response to the training event, an updated computation model that estimates runtimes; wherein the prediction model comprises the update prediction model.

12. The system of any of the preceding statements, wherein the training event comprises at least one of: lapse of a specified period of time, completion of a threshold number of operational runs of the security service, or a change in a configuration input associated with the computing resource.

13. The system of any of the preceding statements, wherein the security service is a scan for cyberattacks on the computing resource.

14. The system of any of the preceding statements, wherein the one or more configuration inputs associated with the computing resource indicate one or more of: a number of endpoints to scan, a number of attack modules, a number of compute instances configured to run the security service, or a hardware configuration of the compute instances.

15. One or more non-transitory computer-accessible storage media storing executable instructions that, when executed by one or more processors, cause a computer system to: receive a request for a runtime of a security service operating with respect to a computing resource; determine a dataset indicative of one or more configuration inputs associated with the computing resource, wherein the security service is configured in accordance with the one or more configuration inputs; determine, based on a prediction model using the dataset as input, an estimated runtime of the security service operating with respect to the computing resource; and provide, in response to the request for the runtime of the security service, the estimated runtime of the security service operating with respect to the computing resource.

16. The non-transitory computer-accessible storage media of any of the preceding statements, wherein the one or more processors further execute the executable instructions to: receive, prior to the receiving the request for the runtime of the security service, a first training dataset indicative of a plurality of configuration inputs associated with a plurality of security service runs associated with a plurality of computing resources; receive, prior to the receiving the request for the runtime of the security service, a second training dataset indicative of a plurality of runtimes associated with the plurality of security service runs; train, based on the first training dataset and on the second training dataset, the prediction model that estimates runtimes.

17. The non-transitory computer-accessible storage media of any of the preceding statements, wherein the one or more processors further execute the executable instructions to: initiate a security service run with respect to the computing resource; determine, based on the security service run, first data indicative of the one or more configuration inputs associated with the computing resource; determine, based on the security service run, second data indicative of a runtime associated with the security service run; and train, based on the first training dataset, on the first data, on the second training dataset, and on the second data, an updated prediction model that estimates runtimes; wherein the prediction model comprises the updated prediction model.

18. The non-transitory computer-accessible storage media of any of the preceding statements, wherein the one or more processors further execute the executable instructions to: determine a training event indicative of one or more conditions associated with retraining the prediction model; and train, in response to the training event, an updated computation model that estimates runtimes; wherein the prediction model comprises the update prediction model.

19. The non-transitory computer-accessible storage media of any of the preceding statements, wherein the training event comprises at least one of: lapse of a specified period of time, completion of a threshold number of operational runs of the security service, or a change in a configuration input associated with the computing resource.

20. The non-transitory computer-accessible storage media of any of the preceding statements, wherein the security service is a scan for cyberattacks on the computing resource.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:
1. A method comprising:
executing program instructions on one or more processors of a computer system, wherein the program instructions are stored in a memory of the computer system and the execution includes:
receiving a request for an estimation of a runtime of a security scan with respect to a computing resource;
determining a dataset that includes one or more configuration inputs associated with the computing resource, wherein the security scan is configured in accordance with the one or more configuration inputs;
determining, based on a prediction model using the dataset as input, an estimated runtime of the security scan with respect to the computing resource; and
providing, in response to the request, the estimated runtime of the security scan with respect to the computing resource.

2. The method of claim 1, the execution further comprising:
receiving, prior to the receiving the request, a first training dataset that includes a plurality of configuration inputs associated with a plurality of security scan runs associated with a plurality of computing resources;

receiving, prior to the receiving the request, a second training dataset that includes a plurality of runtimes associated with the plurality of security scan runs;

training, based on the first training dataset and on the second training dataset, the prediction model that estimates runtimes.

3. The method of claim 2, the execution further comprising:

initiating a security scan run with respect to the computing resource;

determining, based on the security scan run, first data that includes the one or more configuration inputs associated with the computing resource;

determining, based on the security scan run, second data that includes a runtime associated with the security scan run; and training, based on the first training dataset, on the first data, on the second training dataset, and on the second data, an updated prediction model that estimates runtimes;

wherein the prediction model comprises the updated prediction model.

4. The method of claim 1, the execution further comprising:

determining a training event that includes one or more conditions associated with retraining the prediction model; and training, in response to the training event, an updated computation model that estimates runtimes;

wherein the prediction model comprises the updated computation model.

5. The method of claim 4, wherein the training event comprises at least one of: lapse of a specified period of time, completion of a threshold number of operational runs of the security scan, or a change in a configuration input associated with the computing resource.

6. The method of claim 1, wherein the security scan is performed by a security service to scan for vulnerabilities to cyberattacks on the computing resource.

7. The method of claim 1, wherein the one or more configuration inputs associated with the computing resource include one or more of: a number of endpoints to scan, a number of attack modules, a number of compute instances configured to run the security scan, or a hardware configuration of the compute instances.

8. A system comprising:

a memory storing executable instructions; and one or more processors that execute the executable instructions to:

receive a request for an estimation of a runtime of a security scan with respect to a computing resource;

determine a dataset that includes one or more configuration inputs associated with the computing resource, wherein the security scan is configured in accordance with the one or more configuration inputs;

determine, based on a prediction model using the dataset as input, an estimated runtime of the security scan with respect to the computing resource; and provide, in response to the request, the estimated runtime of the security scan with respect to the computing resource.

9. The system of claim 8, wherein the one or more processors further execute the executable instructions to:

receive, prior to the receiving the request, a first training dataset that includes a plurality of configuration inputs associated with a plurality of security scan runs associated with a plurality of computing resources;

receive, prior to the receiving the request, a second training dataset that includes a plurality of runtimes associated with the plurality of security scan runs;

train, based on the first training dataset and on the second training dataset, the prediction model that estimates runtimes.

10. The system of claim 8, wherein the one or more processors further execute the executable instructions to:

initiate a security scan run with respect to the computing resource;

determine, based on the security scan run, first data that includes the one or more configuration inputs associated with the computing resource;

determine, based on the security scan run, second data that includes a runtime associated with the security scan run; and train, based on the first training dataset, on the first data, on the second training dataset, and on the second data, an updated prediction model that estimates runtimes;

wherein the prediction model comprises the updated prediction model.

11. The system of claim 8, wherein the one or more processors further execute the executable instructions to:

determine a training event that includes one or more conditions associated with retraining the prediction model; and train, in response to the training event, an updated computation model that estimates runtimes;

wherein the prediction model comprises the updated computation model.

12. The system of claim 8, wherein the training event comprises at least one of: lapse of a specified period of time, completion of a threshold number of operational runs of the security scan, or a change in a configuration input associated with the computing resource.

13. The system of claim 8, wherein the security scan is performed by a security service to scan for vulnerabilities to cyberattacks on the computing resource.

14. The system of claim 8, wherein the one or more configuration inputs associated with the computing resource include one or more of: a number of endpoints to scan, a number of attack modules, a number of compute instances configured to run the security scan, or a hardware configuration of the compute instances.

15. One or more non-transitory computer-accessible storage media storing executable instructions that, when executed by one or more processors, cause a computer system to:

receive a request for an estimation of a runtime of a security scan with respect to a computing resource;

determine a dataset that includes one or more configuration inputs associated with the computing resource, wherein the security scan is configured in accordance with the one or more configuration inputs;

determine, based on a prediction model using the dataset as input, an estimated runtime of the security scan with respect to the computing resource; and provide, in response to the request, the estimated runtime of the security scan with respect to the computing resource.

16. The non-transitory computer-accessible storage media of claim 15, wherein the one or more processors further execute the executable instructions to:

receive, prior to the receiving the request, a first training dataset that includes a plurality of configuration inputs associated with a plurality of security scan runs associated with a plurality of computing resources;

receive, prior to the receiving the request, a second training dataset that includes a plurality of runtimes associated with the plurality of security scan runs;

train, based on the first training dataset and on the second training dataset, the prediction model that estimates runtimes.

17. The non-transitory computer-accessible storage media of claim 15, wherein the one or more processors further execute the executable instructions to:

initiate a security scan run with respect to the computing resource;

determine, based on the security scan run, first data that includes the one or more configuration inputs associated with the computing resource;

determine, based on the security scan run, second data that includes a runtime associated with the security scan run; and train, based on the first training dataset, on the first data, on the second training dataset, and on the second data, an updated prediction model that estimates runtimes;

wherein the prediction model comprises the updated prediction model.

18. The non-transitory computer-accessible storage media of claim 15, wherein the one or more processors further execute the executable instructions to:

determine a training event that includes one or more conditions associated with retraining the prediction model; and train, in response to the training event, an updated computation model that estimates runtimes;

wherein the prediction model comprises the updated computation model.

19. The non-transitory computer-accessible storage media of claim 15, wherein the training event comprises at least one of: lapse of a specified period of time, completion of a threshold number of operational runs of the security scan, or a change in a configuration input associated with the computing resource.

20. The non-transitory computer-accessible storage media of claim 15, wherein the security scan is performed by a security service to scan for vulnerabilities to cyberattacks on the computing resource.

\* \* \* \* \*